United States Patent [19]
Kennedy

[11] 3,854,777
[45] Dec. 17, 1974

[54] SPOKE MOUNTABLE BRACKET ASSEMBLY

[75] Inventor: James D. Kennedy, Streamwood, Ill.

[73] Assignee: Beatrice Foods Company, Elgin, Ill.

[22] Filed: May 21, 1973

[21] Appl. No.: 362,301

[52] U.S. Cl............ 301/37 SA, 85/32 V, 301/37 R
[51] Int. Cl................................................. B60b 7/00
[58] Field of Search............ 301/37 SA, 37 S, 37 R, 301/12 R; 85/DIG. 2, 32 V; 40/129 B

[56] References Cited
UNITED STATES PATENTS

| | | | |
|---|---|---|---|
| 2,252,932 | 8/1941 | Johnson | 85/32 V |
| 3,082,041 | 3/1963 | Hamilton | 301/37 SA |
| 3,390,917 | 7/1968 | Tilghman | 301/37 SA |
| 3,579,408 | 5/1971 | Dowhan | 301/37 SA |

FOREIGN PATENTS OR APPLICATIONS

| | | | |
|---|---|---|---|
| 626,932 | 12/1927 | France | 301/37 SA |
| 311,577 | 5/1929 | Great Britain | 301/37 SA |

*Primary Examiner*—M. Henson Wood, Jr.
*Assistant Examiner*—Victor N. Sakran
*Attorney, Agent, or Firm*—Hill, Gross, Simpson, Van Santen, Steadman, Chiara & Simpson

[57] ABSTRACT

A bracket assembly adapted for demountably mounting about a bicycle spoke or the like and suitable for mounting a display panel, such as a reflector, license, or the like upon a cycle wheel. The assembly utilizes a slotted rivet-like member of rigid but deformable material, a sleeve, and a screw. The invention is further addressed to display panels incorporating such bracket assemblies.

6 Claims, 7 Drawing Figures

PATENTED DEC 17 1974

3,854,777

SPOKE MOUNTABLE BRACKET ASSEMBLY

BACKGROUND OF THE INVENTION

Means for mounting display panels, such as reflectors, license plates, and the like against and upon the spokes of a bicycle, tricycle, or the like have heretofore been proposed, but such generally suffer from one or more serious disadvantages included among which are spoke damage or alteration, excessive weight, cumbersomeness, complexity, unattractiveness, tendency to loosen in use, suitability for only one wheel design (or spoke angle), as when two spokes are to be used for mounting a reflector or the like, high cost, fragility, etc.

Simple, inexpensive, reliable mounting brackets for use on cycle spokes have been very slow to appear in the art, especially a bracket of this type which is further adapted for installation on any one of a wide variety of spoke supported and suspended cycle members. The need in the art of such a bracket is very great owing to a rapid recent increase in the desire to mount reflector assemblies on cycle spokes to improve cycle operator safety at night.

BRIEF SUMMARY OF THE INVENTION

The present invention is directed to a simple, economical, adjustable bracket assembly adapted to be highly reliable and further adapted for spoke mounting on a cycle wheel.

A single such bracket assembly is generally sufficient to achieve a desired mounting of a display device upon a cycle wheel, but two are preferred, one each on a different spoke and separated from one another by the width or length (as the case may be) of a reflector or other display device to be mounted on spokes by such bracket assembly, and three or more such assemblies may be used with a single display device, if desired.

The bracket assembly is characteristically of durable construction and may be readily fabricated from inexpensive materials using inexpensive procedures.

In one form, such a bracket assembly is capable of serving as a universal mounting fixture for many different types, sizes, and styles of cycle wheels and of display panels.

The present invention further provides display panels utilizing a bracket assembly as described herein which panels may be easily and simply mounted on a cycle wheel's spokes to produce a stable configuration of superior durability.

Other and further objects, purposes, advantages, utilities, and features will be apparent to those skilled in the art from a reading of the present specification and drawings.

DETAILED DESCRIPTION

Figure 4:
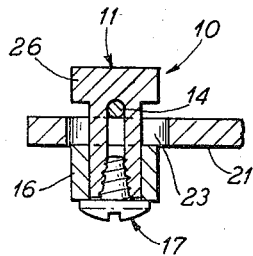
FIG. 4 is a vertical sectional view taken along the line 4—4 of FIG. 1.
Figure 5:
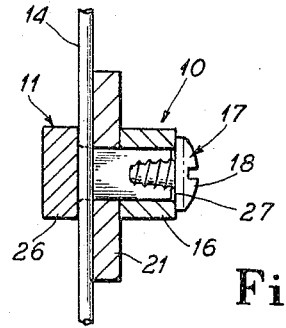
FIG. 5 is a vertical sectional view taken along the line 5—5 of FIG. 1.
Figure 6:
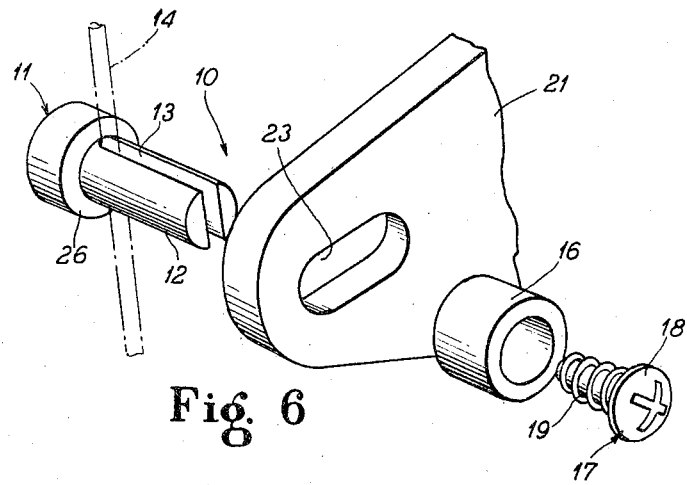
FIG. 6 is an exploded view in perspective of the bracket assembly shown in FIG. 1 taken at the left-hand end of the reflector assembly shown in FIG. 1.

Referring to FIGS. 4 through 6, there is seen one embodiment of a spoke mountable bracket assembly of the present invention herein designated in its entirety by the numeral 10. Bracket 10 utilizes a rivetlike member 11 which has a shank 12 of generally uniform cylindrical proportions. Shank 12 has a longitudinal slot 13 diametrically extending therethrough, the width of slot 13 being chosen so as to be larger than the predetermined diameter of a predetermined spoke 14 since, as those skilled in the art appreciate, cycle spokes generally have diameters ranging from about .060 to .135 inches. It is convenient and preferred, therefore, in fabricating a rivet-like member 11 to make the width of slot 13 be slightly in excess of about .080 inch, although larger and smaller widths for slot 13 may be used if desired, especially in individual use situations, without departing from the spirit and scope of the present invention.

A rivet-like member 11 is formed of rigid but reformable material and may be constructed of metal, plastic (preferred), or the like. Examples of suitable plastics includes polyamides, polyesters, rubber reinforced polyacrylics and polystyrenes, and the like, as those skilled in the art will appreciate.

The bracket assembly 10 incorporates a sleeve 16 which is adapted to slidably engage on its inside surfaces with the outer surfaces of shank 12, such respective inner and outer surfaces generally being in face-to-face engagement with one another. The sleeve 16 is adapted to resist radially outward movements of the shank 12. Sleeve 16 may be formed of any convenient material, such as metal or plastic (preferred), as those skilled in the art will appreciate.

A bracket assembly 10 incorporates a screw 17 having a conventional head 18 (preferably slotted) and further having a conventional shank 19 (preferably tapered).

A flattened member (here mounting base 21 of reflector assembly 22; see FIG. 1) has an aperture 23 defined therein (referring to FIG. 6 in the present description). The aperture 23 is adapted for mounting over the shank 12 of rivet-like member 11 and is further adapted to be retained on shank 12 by sleeve 16. In the embodiment shown, the aperture 23 is elongated which is a preferred configuration for an aperture 23 in order to provide greater universality in mounting a display device, such as a reflector assembly 22, to spokes, such as 14, more or less independently of the precise positioning of spokes 14 in an individual cycle wheel 24.

As those skilled in the art will appreciate in place of mounting base 21 one could use any flattened member such as a projecting tab from a display device (not shown) or the like. The material of construction, the thickness and like variables are not critical for purposes of the present invention, as those skilled in the art will appreciate.

The length of the shank 19 of screw 17 is chosen so as to be somewhat less than the combined width of the sleeve 16 and the thickness of a predetermined one of such a flattened member such as the mounting base 21. Also, the rivet like member 11 has its shank 12 with a length chosen so as to be shorter than the combined thickness of a spoke 14, the width of sleeve 16, and the thickness of such a flattened member like mounting base 21.

To assemble and utilize a bracket assembly 10 one may first project rivet like member 11 over a spoke 14 so that the spoke 14 abuts against the inside surface of the head 26 of member 11. Mounting base 21 is then positioned over member 11 so that the aperture 23 of base 21 slidably engages the shank 12 of member 11. Thereafter, the sleeve 16 is slipped over the end of shank 12, and, finally, screw 17 is placed in the end of slot 13 and turned (in embodiment 10 in clockwise fashion, to seat and be threadably engaged within shank 12.

In assembly 10, the shank 12 is self-threading by the screw 17, owing to the material of construction used in member 11. If desired, member 11 may be formed with threads formed in the slot 13, but, especially when the member 11 is formed of a plastic material, it is preferred to have the member 11 be self threading in order to avoid additional cause in mold fabrication such as would result if threads were to be formed in the end of slot 13, all as those skilled in the art will appreciate.

Preferably after assembly, the thickness of a mounting base 21 or the like is such that, after screw 19 has been turned into shank 12 to a full extent, there is an abutting relationship between the inside of head 26, spoke 14, mounting base 21, opposite ends of sleeve 16, and the inside face of head 18, instead of having a loose fitting engaging inter-relationship between the elements comprising bracket assembly 10, spoke 14, and mounting base 21, as those skilled in the art will appreciate, although one may utilize a somewhat looser relationship depending on the frictional engagement of screw shank 19 with shank 12 to maintain a desired, reliable fastening of a bracket assembly 10, to a spoke 14 with a mounting base 21 therebetween, as those skilled in the art will appreciate. Because of the interrelationship between a bracket assembly 10 and a mounting base 21 or the like, in a preferred form, the present invention relates to combinations of a bracket assembly 10 with a mounting base 21 or the like wherein the length of shank 12 and the length of shank 19 are chosen to take into account the particular thickness of a mounting base 21. Preferably, the interrelationship between the respective lengths of shanks 12 and 19, and the thickness of a mounting base 21 or the like, is such that, in a fully assembled configuration such as illustrated in FIGS. 4 and 5 the respective members have the abutting face-to-face interrelationship before indicated.

Figure 1:
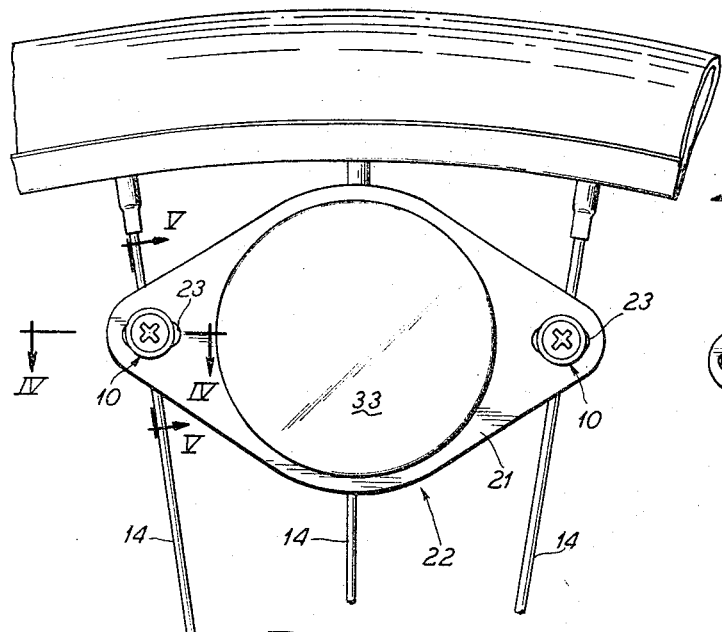
FIG. 1 is a fragmentary view in side elevation of a bicycle wheel having a reflector mounted on the spokes thereof with one embodiment of a bracket assembly of the present invention.

A preferred combination of bracket assemblies 10 with a reflector assembly 22 is shown in FIG. 1. Observe that this composite assembly is adapted for mounting on any of a very wide variety of cycle wheels such as 24, not only because an individual bracket assembly 10 may be moved through incrementally an infinite variety of degree changes relative to a mounting base 21, but also because an individual bracket assembly 10 is adapted to move laterally within an individual aperture 23 in the mounting base 21. Such versatility constitutes an unusual and surprising feature of the present invention.

Figure 2:
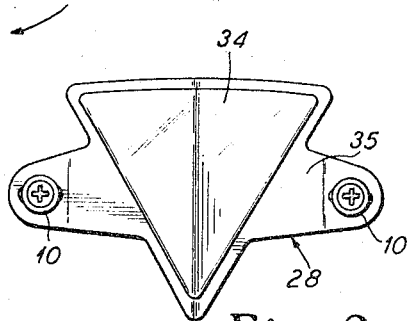
FIG. 2 is a side elevational view of another reflector adapted for mounting on the spokes of a cycle wheel utilizing the embodiment of the bracket assembly shown in FIG. 1.
Figure 3:
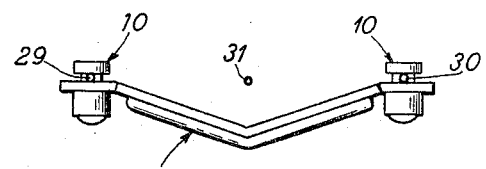
FIG. 3 is a top plan view of the reflector assembly of FIG. 2 mounted on the spokes of a bicycle wheel, the spokes being shown in section.

Another embodiment of a bracket assembly 10 in combination with a different reflector assembly 28 is illustrated in FIGS. 2 and 3. Here, circular holes for bracket assemblies 10 are provided, but as will be appreciated by those skilled in the art, a great deal of latitude is provided for mounting a composite assembly upon a bicycle scope. From FIG. 3, for example, where composite assembly is shown mounted on spokes 29 and 30 across an intervening spoke 31, it will be appreciated that it is merely necessary to position the reflector assembly 28 radially with respect to a cycle wheel (not shown) until the spacing between the bracket assemblies 10 is such that the spokes 29 and 30 may be positioned in the individual assemblies 10 in the manner illustrated. However, the type of composite assembly illustrated in FIG. 1 which utilizes a slotted aperture 23 is a much preferred form of the present invention.

Reflector assemblies 22 and 28, as such, are of conventional design and do not form a part of the present invention, as such. Briefly reflector assembly 22 has a reflector 33 mounted in its base 21 and reflector assembly 28 has a reflector 34 mounted in its base 35. While base 21 has a generally flat configuration, the base 35 has an angular configuration, as illustrated, for example, in FIG. 3, the latter configuration being intended to provide side viewability and ease in mounting over and upon the spoke portions of a cycle wheel, such as a wheel 24. Those skilled in the art will appreciate, that, in place of reflector assemblies 28 and 22, one may employ any desired display device, including a license plate, or the like, in combination with the bracket assemblies 10, though in any preferred embodiments, adjustments are made in lengths of respective shanks 12 and 19 to accommodate the thickness of such display devices at their mounting positions, as explained hereinabove.

Although in the assembly 10, the slot 13 extends preferably diametrically therethrough, those skilled in the art will appreciate that the slot could be diametrically offset.

Figure 7:
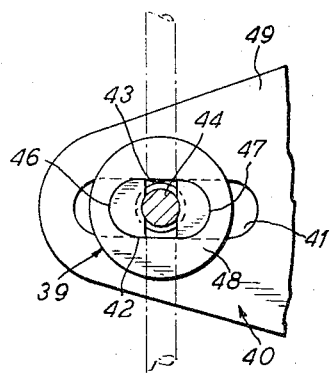
FIG. 7 is a sectional view horizontally taken through a composite assembly of display panel and bracket assembly illustrating another embodiment of the present invention.

In order to accommodate spokes of different diameter, particularly spokes of the larger diameters commonly found in contemporary sidewalk bikes, a bracket assembly 39 may be employed with a base member 40 having a slotted aperture 41, such as shown, for example, in FIG. 7. Here a rivet-like member 42 is not cylindrically shaped as in assembly 10, but rather is elongated in a sidewards direction as illustrated. In such rivet member 42, the slot 43 is chosen so as to have a width appropriate for slidable engagement with a predetermined spoke member 44. The screw used with the assembly 39 is not shown, in order to better illustrate the functions and advantages of the present embodiments. Should a spoke 44 having a larger diameter than that shown in FIG. 7 be presented for use with assembly 39, then one may utilize a rivet-like member 42 having a slot 43 of larger width to accommodate same. To achieve such larger width in a slot 42, one can laterally extend the opposed side wall portions 46 and 47 of the rivet-like member 42 to provide enough material in a rivet-like member 42 for a predetermined structural strength, as desired by an individual user. Of course, as those skilled in the art will appreciate, with changes in the cross sectional configuration of a rivet-like member 42, a change in the internal aperture of the sleeve 48, used with rivet member 42 is made. The slot 42 extends transversely across the narrower portions of the shank of member 42. Thus, by utilizing the principles of the embodiment shown in FIG. 7, a single reflector assembly 49 may be utilized for mounting a display device on a very wide variety of cycle wheels, including not only adult-type bicycles, but also children-type sidewalk bikes.

More than one flattened member may be interposed between a sleeve and a spoke when a bracket assembly of this invention is mounted on a spoke, as those skilled in the art will readily appreciate.

Preferably in a bracket assembly of this invention, the width of the sleeve member thereof is at least about 1/3 the length of the shank of the rivet-like member, although narrower and wider sleeve widths may be used, of course, within the spirit and scope of this invention.

While no particular criticality is associated with the thickness of a display panel to be mounted together with a bracket assembly in combination, those skilled in the art will appreciate that, when a particular panel is formed of plastic material, the thickness thereof tends to be thicker than the thickness of a display panel formed of sheet metal, or the like.

Other and further embodiments and variations of the present invention will become apparent to those skilled in the art from a reading of the present specification taken together with the drawings, and no undue limitations are to be inferred or implied from the present disclosure.

The claims are:

1. A display device for mounting on a cycle-type vehicle spoke member comprising a bracket member and a generally flattened body member,
    A. said bracket member comprising:
        1. a rivet-like means having a longitudinally slotted shank, said shank having a generally uniform cross-sectional configuration, said slot being capable of receiving therein a spoke member, said rivet-like means being formed of rigid but deformable material,
        2. a sleeve for mounting circumferentially about said slotted shank and adapted to resist radially outward movements thereof,
        3. a screw having a tapered shank which is adapted to engage the outer end portion of said slot of said slotted shank, the length of said tapered shank being less than the length of said slotted shank, the circumferential outer wall of said slotted shank being radially expanded against the inside wall of said sleeve when said screw is turned into said slot and said sleeve is engaged about said slotted shank,
    B. said flattened body member having:
        1. an aperture transversely defined therein whose size permits said slotted shank to extend therethrough and further permits the head of said rivet-like means to abut against the aperture adjacent portions of said flattened body member, and
        2. a central portion adapted for holding a display panel,
    C. the interrelationship between the length of each of said shanks, the longitudinal length of said sleeve and the thickness of said adjacent portions of said flattened body member being such that when said bracket member and said flattened body member are engaged with a said spoke member between said flattened body member engaged with a said spoke member between said flattened body member and said rivet head, the length of said slotted shank is slightly less than the combined thicknesses of said spoke, said sleeve longitudinal length and said flattened body member.

2. The display device of claim 1 wherein said gap is equal to about the thickness of a predetermined display device in the region of an aperture formed in such device.

3. The display device of claim 1 wherein said aperture is generally elongated.

4. The display device of claim 1 wherein said aperture is generally circular.

5. The display device of claim 1 wherein said rivet-like means has a cylindrical shank.

6. The display device of claim 1 wherein said rivet-like means has a shank which is cross-sectionally elongated and wherein the slot extends generally across the narrowest region thereof.

* * * * *